United States Patent
Razzano et al.

(10) Patent No.: US 9,800,740 B2
(45) Date of Patent: Oct. 24, 2017

(54) PUSH/PULL HYBRID FOR WIRELESS DEVICE USAGE METERING

(71) Applicant: Verizon Patent and Licensing Inc., Arlington, VA (US)

(72) Inventors: Neil Thomas Razzano, North Brunswick, NJ (US); Henry H. Li, Madison, NJ (US); Meera Deshpande Kumarjiguda, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 108 days.

(21) Appl. No.: 14/880,444

(22) Filed: Oct. 12, 2015

(65) Prior Publication Data

US 2017/0104878 A1   Apr. 13, 2017

(51) Int. Cl.

| | |
|---|---|
| *H04M 11/00* | (2006.01) |
| *H04M 15/28* | (2006.01) |
| *H04W 4/24* | (2009.01) |
| *H04L 29/08* | (2006.01) |
| *H04M 15/00* | (2006.01) |
| *G06F 3/0481* | (2013.01) |

(52) U.S. Cl.
CPC .......... *H04M 15/28* (2013.01); *G06F 3/0481* (2013.01); *H04L 67/26* (2013.01); *H04M 15/83* (2013.01); *H04W 4/24* (2013.01)

(58) Field of Classification Search
None
See application file for complete search history.

(56) References Cited

U.S. PATENT DOCUMENTS

| | | | |
|---|---|---|---|
| 8,503,978 B2 | 8/2013 | Gaddam et al. | |
| 2013/0196622 A1* | 8/2013 | Zalmanovitch | H04W 24/02 455/406 |
| 2014/0199961 A1* | 7/2014 | Mohammed | H04L 63/0428 455/406 |

* cited by examiner

*Primary Examiner* — Erika Washington (57) ABSTRACT

A method including obtaining, via a first push notification received by a mobile station, a first usage amount of a mobile communication network resource allocation associated with the mobile station; storing, in the mobile station, the first usage amount; determining that the stored first usage amount is out of date; in response to the determination that the stored first usage amount is out of date, transmitting a request for a usage amount of the mobile communication network resource allocation; receiving a response to the request, the response indicating a second usage amount of the mobile communication network resource allocation; and displaying, on a display unit included in the mobile station, a graphical indication of an amount of the mobile communication network resource allocation that has been used or remains to be used, based on the second usage amount.

18 Claims, 8 Drawing Sheets

PUSH/PULL HYBRID FOR WIRELESS DEVICE USAGE METERING

BACKGROUND

Many advanced mobile communication networks offer wireless mobile communication service for voice calls, mobile messaging services (e.g. text and/or multimedia), and data communications. The data services, for example, enable surfing the world wide web via a browser on mobile stations, or receiving multimedia services on the mobile stations. Often, a user of a mobile station may want to find out a current estimate amount of resource usage, such as data or voice usage, by the mobile station for various reasons, including the user's concerns for billing purposes. One solution is providing an application, such as a widget, which allows the user to review resource usage directly on their mobile station.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
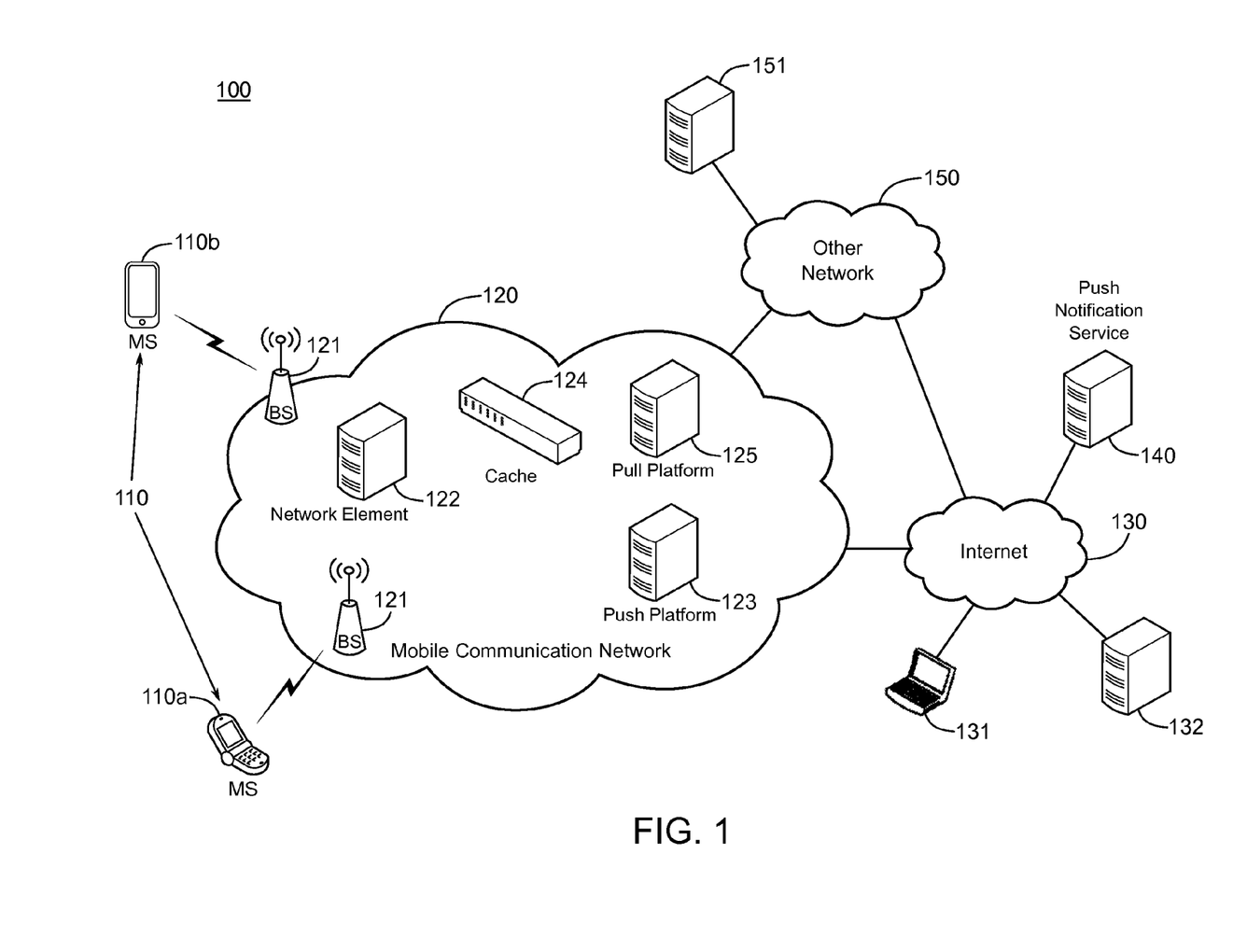
FIG. 1 is a high-level functional block diagram illustrating an example system of networks/devices that provide various communications for mobile stations and support updating a current estimate of resource usage, as measured in a network, on a mobile station.

FIG. 1 illustrates an example system 100 offering a variety of mobile communication services, including communications for data services by users of mobile stations 110 (110a or 110b). The example shows simply two mobile stations (MSs) 110a and 110b as well as a mobile communication network 120. The mobile stations 110a and 110b are examples of mobile stations that may be used for data services, such as receiving usage of data communication service by the mobile stations. However, the network will provide similar communications for many other similar users as well as for mobile stations/users that do not participate in the data services. The network 120 provides mobile wireless communications services to those mobile stations 110a and 110b as well as to other mobile stations (not shown), for example, via a number of base stations (BSs) 121. The present techniques may be implemented in any of a variety of available mobile networks 120 and/or on any type of mobile station compatible with such a network 120, and the drawing shows only a very simplified example of a few relevant elements of the network 120 for purposes of discussion herein.

The wireless mobile communication network 120 might be implemented as a network conforming to, for example, the code division multiple access (CDMA) IS-95 standard, the 3rd Generation Partnership Project 2 (3GPP2) or the Evolution Data Optimized (EVDO) standard, the Global System for Mobile (GSM) communication standard, a time division multiple access (TDMA) standard, Long Term Evolution (LTE) standard, other standards or their variants used for public mobile wireless communications. The mobile stations 110a and 110b may be capable of voice telephone communications through the network 120; and for the data communication services, the exemplary devices 110a and 110b are capable of data communications through the particular type of network 120 (and the users thereof typically will have subscribed to data services through the network).

The network 120 allows users of the mobile stations such as 110a and 110b (and other mobile stations not shown) to initiate and receive telephone calls to each other as well as through the public switched telephone network (PSTN) (not illustrated) and telephone stations connected to the PSTN. The network 120 typically offers a variety of data services via the Internet 130, such as downloads, web browsing, email, etc. By way of example, FIG. 1 illustrates a laptop personal computer (PC) type user terminal 131, a server 132 connected to the Internet 130; and the data services for the mobile stations 110a and 110b via the Internet 130 may be with devices like those shown at 131 and 132 as well as with a variety of other types of devices or systems capable of data communications through various interconnected networks. The mobile stations 110a and 110b of users of the data communications service also can receive and execute applications written in various programming languages, as discussed more later.

Mobile stations 110a and 110b can take the form of, for example, portable handsets, e-book readers, tablet computers, smart-phones or personal digital assistants, although they may be implemented in other form factors. Program applications, including an application to assist in the data communication service can be configured to execute on many different types of mobile stations 110a and 110b. For example, a mobile application can be written to execute in, for example, an iOS or Android operating system, or on a binary runtime environment for a BREW-based mobile station, a Windows Mobile based mobile station, Java Mobile, or RIM based mobile station (such as a BlackBerry or the like), or the like. Some of these types of mobile stations can employ a multi-tasking operating system as well.

The mobile communication network 120 can be implemented by a number of interconnected networks. Hence, the overall network 120 may include a number of radio access networks (RANs), as well as regional ground networks interconnecting a number of RANs and a wide area network (WAN) interconnecting the regional ground networks to core network elements. A regional portion of the network 120, such as that serving mobile stations 110, can include one or more RANs and a regional circuit and/or packet switched network and associated signaling network facilities.

Physical elements of a RAN operated by one of the mobile service providers or carriers include a number of base stations represented in the example by the base stations (BSs) 121. Although not separately shown, such a base station 121 can include a base transceiver system (BTS), which can communicate via an antennae system at the site of base station and over the air link with one or more of the mobile stations 110, when the mobile stations are within range. Each base station can include a BTS coupled to several antennae mounted on a radio tower within a coverage area often referred to as a "cell." The BTS is the part of the radio network that sends and receives radio frequency (RF) signals to/from the mobile stations 110 that are served by the base station 121.

The radio access networks can also include a traffic network represented generally by the cloud at 120, which carries the user communications and data for the mobile stations 110 between the base stations 121 and other elements with or through which the mobile stations 110 communicate. Specific elements of the network 120 for carrying the voice and data traffic and for controlling various aspects of the calls or sessions through the network 120 are omitted here for simplicity. It will be understood that the various network elements can communicate with each other and other aspects of the mobile communications network 120 and other networks (e.g., the public switched telephone network and the Internet) either directly or indirectly.

The carrier will also operate a number of systems that provide ancillary functions in support of the communications services and/or application services that the carrier offers through the network 120, and those elements communicate with other nodes or elements of the network 120 via one or more private Internet Protocol (IP) type packet data networks 150 (sometimes referred to as an Intranet), i.e., a private networks. Generally, such systems are part of or connected for communication via the private network 150. However, it is well known that systems outside of the private network could serve the same functions as well. Examples of such systems, in this case operated by the network service provider as part of the overall network 120, which communicate through the intranet type network 150, include one or more application servers 151, network elements 122, caches 124, push platforms 123, and pull platforms 125.

A mobile station 110 communicates over the air with a base station 121 and through the traffic network 120 for various voice and data communications, e.g., through the Internet 130 with a server 132 and/or with application servers 151. If the service carrier offers a real-time resource usage service, the service may be hosted on a carrier operated application server 151, for communication via the networks 120 and 150. Here, the real-time resource usage service is a data service providing users of mobile stations 110 with current estimates of billable usage of mobile communication service by the mobile stations 110, as measured in the network. Alternatively, the real-time resource usage service may be provided by a separate entity (alone or through agreements with the carrier), in which case the service may be hosted on an application server such as server 132 connected for communication via the networks 120 and 130. Servers such as 132 and 151 may provide any of a variety of common applications or service functions in support of or in addition to an application program running on the mobile station 110. However, for purposes of further discussion, we will focus on functions thereof in support of the real-time data usage service. For a given service, including the real-time resource usage service, an application program within the mobile station 110 may be considered as a "client" and the programming at a computer platform 132 or computer platform 151 may be considered as the "server" application for the particular service.

Figure 6:
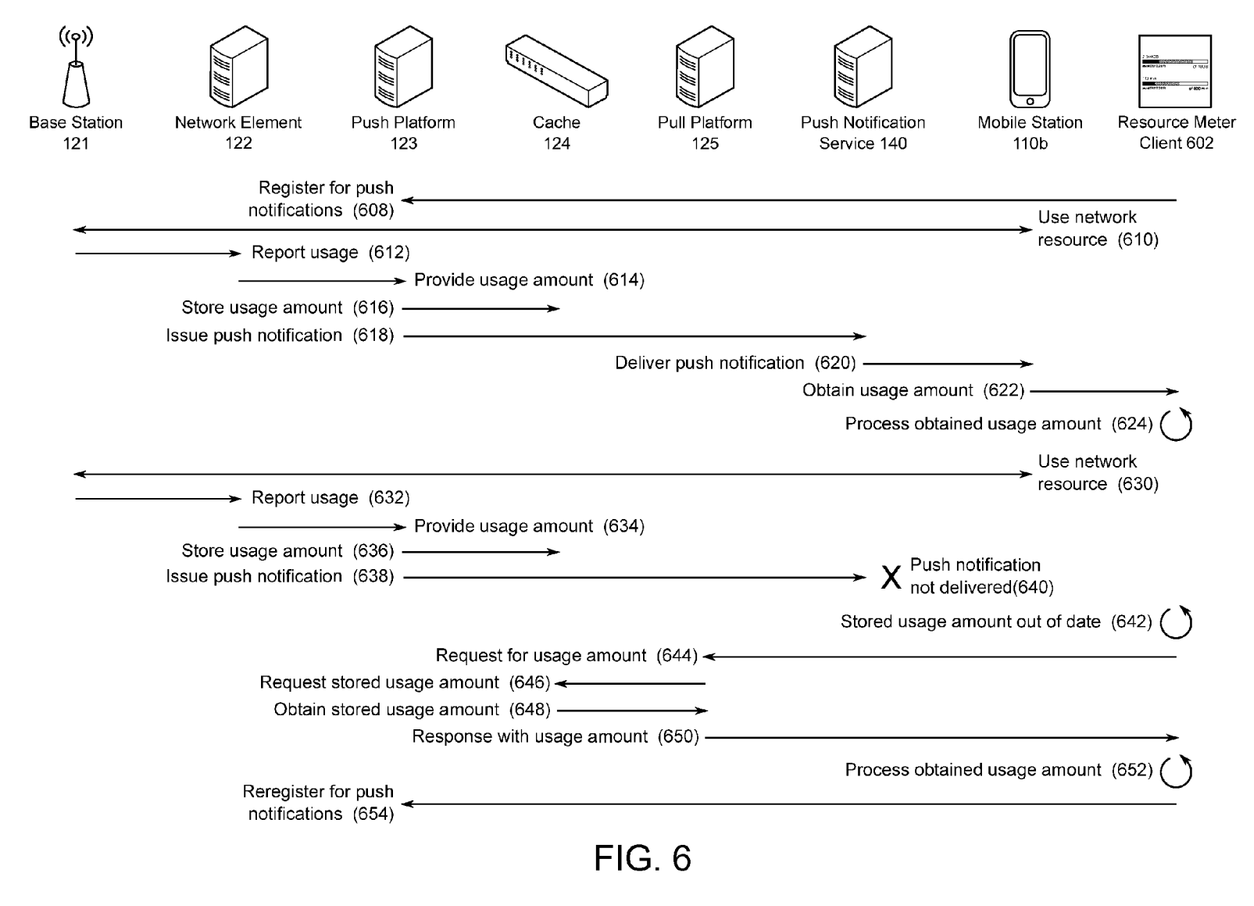
FIG. 6 illustrates various examples in which elements illustrated in FIG. 1 may interact with each other.

In the example illustrated in FIG. 1, system 100 includes network element 122, push platform 123, cache 124, pull platform 125, and push notification service 140. Although FIG. 1 illustrates single and separate instances of these elements, in various implementations the functions of these elements may be combined or divided among various computer systems as desired. Examples of interactions between these elements, along with other elements of system 100, are illustrated in FIG. 6. Network element 122 is configured to determine which usage of network 120 by the mobile stations 110 is to be applied against mobile network resource allocations associated with the mobile stations 110. For example, with respect to data transfer between network 120 and mobile station 110a, only a portion of an actual number of bytes of data transferred may be applied against a mobile network resource allocation associated with mobile station 110a due to transmission retries or transfers initiated by network 120 rather than a user of mobile station 110a.

Two particular examples of mobile communication network resource allocations include data transfer amount and voice communication time. Other examples are discussed below. As an example, mobile station 110a may be associated with a first mobile communication network resource allocation of 10 gigabytes per month of data transfer via network 120, and also associated with a second mobile communication network resource allocation of 600 minutes per month of voice communication services via network 120, and mobile station 110b may be a tablet device associated with a third mobile communication network resource allocation of 20 gigabytes per month of data transfer via network 120. As another example, mobile station 110a may be associated with the above first and second mobile communication network resource allocations, and mobile station 110b may also be owned by the same user as mobile station 110a, and associated with the above first mobile communication network resource allocation, such that mobile stations 110a and 110b are both associated with and share a common mobile communication network resource allocation.

Network element 122 may be configured to identify and transmit events to push platform 123 to provide updated usage amount information to mobile stations 110. For example, network element 122 may be configured to generate events at predefined usage amount intervals, such as for every 1 or 5 percent of a mobile network resource allocation being used. Push platform 123 may be configured to store updated usage amounts in cache 124, and transmit the updated usage amounts to mobile stations 110 via push notification service 140.

One implementation of push notification service 140 is the Apple Push Notification service (APNs), which is presently designed to send messages to at least Apple iPhone™, Apple iPad™, and Apple iTouch™ devices. The push notifications are formatted messages that can be received by such devices anytime they are running and connected to either the Internet or a cellular data network. Although the following description uses the APNs as an example, use of the APNs is not required, nor should this example be considered limiting. Other push notification services that have different message formats and different capabilities may also be used.

The Apple Push Notification service allows an application that is installed on an Apple device such as the Apple iPhone™ to complete a registration process that results in the application receiving a device token. The device token uniquely identifies the mobile station itself. The application on the mobile station then provides this token to the service provider that created the application on the mobile station.

Once the service provider has possession of the token associated with a mobile station, the service provider can cause the APNs to send push notifications to the mobile station. A request for a push notification that is sent from the service provider to the APNs would include the device token, and information about the type of push notification that is to be sent to the mobile station.

When the APNs receives a push notification request from a service provider, it uses the information in the request to create a formatted push notification that it then delivers to the mobile station. The push notification can cause the mobile station to take several different actions. For example, a push notification can cause the mobile station to update a number displayed on a badge associated with the service provider's application. The number usually indicates that new information is available to the application, and the number may indicate the quantity of the new information. When a user sees a number on an application badge, the user can press the badge to load and run the application, which usually results in the application requesting and obtaining the new information that is waiting.

A push notification can also cause a notification message to be displayed on the mobile station. The notification message will usually include two buttons that the user can press. One button, usually labeled as "DISMISS," allows the user to dismiss the notification message. If the user presses this button, the notification message will no longer be displayed, and no further action will be taken by the mobile station.

However, if the user pushes the other button, which is usually labeled as "VIEW," the mobile station will load and run the application on the mobile station that is associated with the service provider that caused the push notification to be sent. In other configurations, when a push notification is received by a mobile station, the mobile station simply automatically loads and runs a particular application associated with the push notification, without waiting for user intervention.

As explained above, a push notification message is typically associated with a particular application that is resident on a mobile station. In some instances, the application may already be running on the mobile station when a push notification message associated with the application is received. In this situation, the push notification message is passed along to the station, either automatically, or only after the user grants permission for the message to be passed along.

APNs also supports push notifications which may be delivered silently to an application installed on a mobile station. These silent pushes can be used to update an application in near real time. APNs provides a best effort delivery system, which does not claim guaranteed or assured delivery. As a result, push notifications can be dropped. Also, in the event that a user terminates an application by a "force quit" of the application, a push notification may be received by a mobile station, but not passed along to the application that the user terminated, resulting in the push notification effectively being dropped.

The real-time resource usage information under consideration herein may be delivered to touch screen type mobile stations as well as to non-touch type mobile stations. Hence, the simple example illustrated in FIG. 1 illustrates the mobile station (MS) 110*a* as a non-touch type mobile station and shows the mobile station (MS) 110*b* as a touch screen type mobile station. Implementation of the real-time resource usage service will involve at least some execution of programming in the mobile stations 110 as well as implementation of user input/output functions and data communications through the network 110, from the mobile stations 110.

Figure 2:
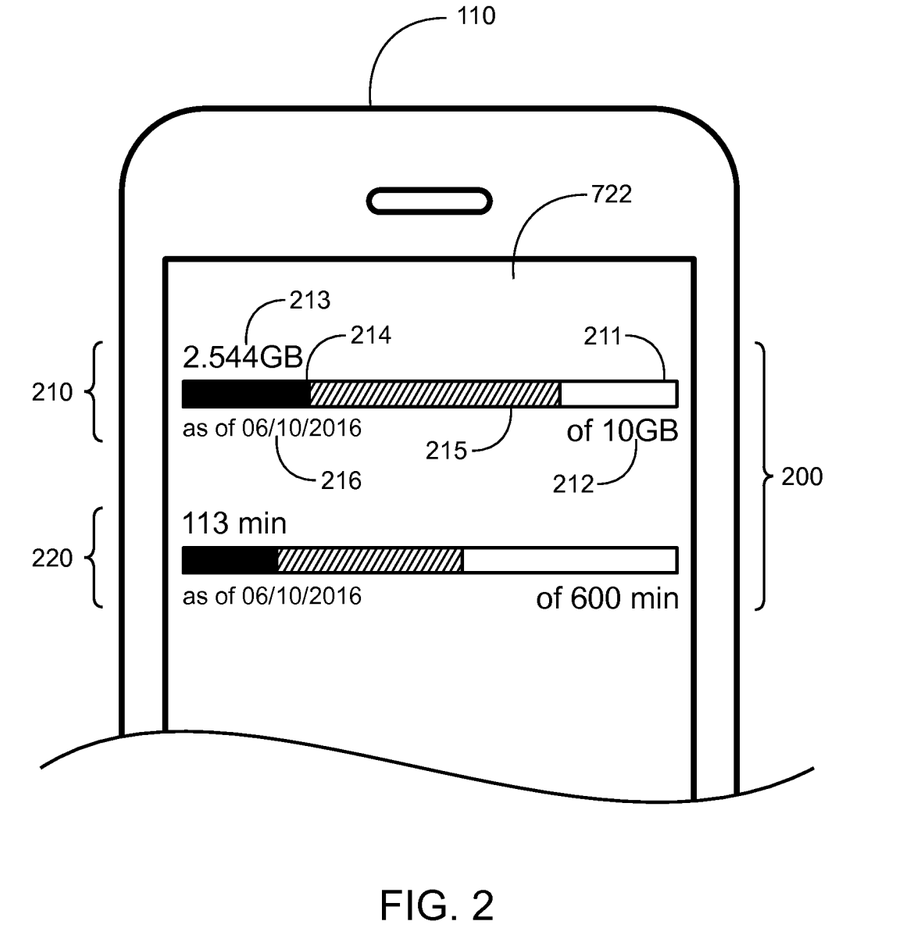
FIG. 2 illustrates an example of an application user interface (UI) provided by a resource meter client executing on a mobile station.

FIG. 2 illustrates an example of an application user interface (UI) 200 provided by a resource meter client 602 executing on a mobile station 110. Resource meter client 602 comprises software executed by mobile station 110. In some examples, resource meter client 602 may be an application or app downloaded to and installed on mobile station 110. Resource meter client 602 configures mobile station 110 to perform various real-time resource usage monitoring functions, including, for example, the various functions illustrated in FIGS. 3-6. Resource meter client 602 also configures mobile station 110 to display application UI 200, such as via presentation on display 722. In some examples, application UI 200 may be presented in the form of a widget.

In the particular example illustrated in FIG. 2, application UI 200 includes two resource usage displays: data transfer usage display 210 and voice communication usage display 220. In some examples, application UI 200 may only include one of resource usage displays 210 and 220. Data transfer usage display 210 displays a graphical indication of an amount of a mobile communication network data transfer allocation associated with the mobile station 110 that has been used and/or remains to be used. Data transfer usage display 210 includes bar graph 211. In the particular example illustrated in FIG. 2, the bar graph relates to resource usage for a particular period of time, such as a monthly billing period. Data transfer usage display 210 may include allocation amount display 212; in this particular example, a textual display indicates that the mobile communication network resource allocation for data transfer is 10 gigabytes (GB). Data transfer usage display 210 may include allocation usage display 213 which shows an amount of the allocation that has been used; in this particular example, a textual display indicates that 2.544 GB of the 10 GB allocation has been used. Data transfer usage display 210 may include date/time display 216 to indicate a date and/or time associated with the displayed usage information, such as when resource meter client 602 most recently received usage amount information or when the usage amount information was determined by network 120; in this particular example, the usage information is current as of Jun. 10, 2016. In some examples, date/time display 216 may be selectively displayed based on whether the most recently received usage amount is older than a predetermined amount of time. This allows a user to understand that resource meter client 602 does not at that particular time have real-time usage information. Bar graph 211 includes actual usage portion 214 to provide a graphical indication of an amount of the allocation that has actually been used; in this particular example, 25.44% has been used. The remaining portion of bar graph 211, including the hatched and white portions, provides an indication of a remaining amount of the allocation. Bar graph 211 may include projected usage portion 215 to provide a graphical indication of a projected usage of the allocation; in this particular example, it is projected that 76.32% of the allocation will be used during the particular period of time that bar graph 211 relates to.

FIG. 2 merely provides one example of a data transfer usage display 210. There are many other ways in which usage of a mobile communication network data transfer allocation associated with the mobile station 110 may be indicated to a user of mobile station 110, including, but not limited to, various graphical, textual, audible, vibratory, and/or haptic indications.

Voice communication usage display 220 displays a graphical indication of an amount of a mobile communication network voice communication time allocation associated with the mobile station 110 that has been used and/or remains to be used. Voice communication usage display 220 functions in much the same manner discussed above with respect to data transfer usage display 210.

Although FIG. 2 illustrates two particular examples of mobile communication network resource allocations, data transfer and voice communication time, these are not the only examples of mobile communication network resource allocations. Other examples include, but are not limited to, email storage space provided by network 120; data storage space provided by network 120; a number of files transferred during a particular period of time; and a number of songs, videos, or other multimedia transferred during a particular period of time. Additionally, although examples are discussed above relating to allocations for particular periods of time, such allocations may instead extend indefinitely. For example, a user may purchase a prepaid amount of voice or data service.

A mobile communication network resource allocation may be associated with one or more mobile stations. For example, both mobile station 110*a* and 110*b* may share a single mobile communication network resource allocation for data transfer via mobile communication network 120. In such situations, application user interface 200 may reflect total usage of an allocation by all of the mobile stations associated with the allocation. In some examples, application user interface 200 may display the respective amounts of usage of each associated mobile station.

Figure 3:
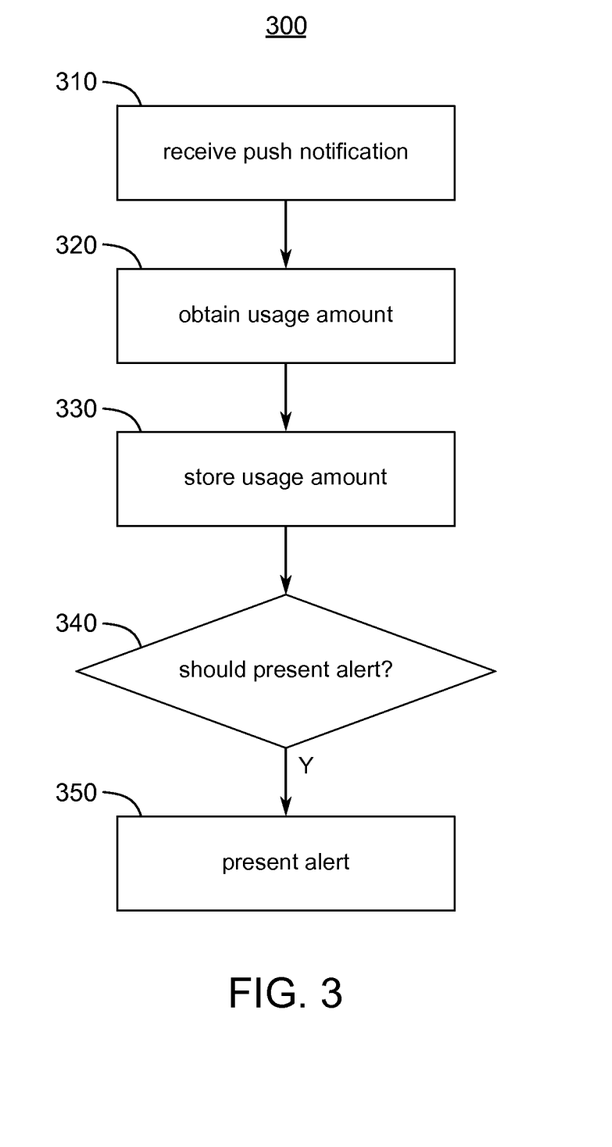
FIG. 3 illustrates an example of a method in which mobile station and a resource meter client running thereon receive and process a push notification issued by the push platform illustrated in FIG. 1.

FIG. 3 illustrates an example of a method in which a mobile station and a resource meter client 602 running thereon receive and process a push notification issued by the push platform 123 illustrated in FIG. 1. Further details relating to the issuing of the push notification are discussed with respect to FIG. 6. At 310, a mobile station 110 receives a push notification initially issued by push platform 123. In some examples, the push notification may pass through push notification service 140. Mobile station 110 examines the received push notification, identifies the push notification as being associated with resource meter client 602, and provides the push notification to resource meter client 602.

At 320, resource meter client 602 obtains a usage amount of a mobile communication network resource allocation associated with mobile station 110 via the push notification. The push notification may include a payload indicating the usage amount or a change in the usage amount from which the usage amount may be calculated. In some examples, the push notification itself does not provide the usage amount, but instead indicates that an updated usage amount is available, in response to which resource meter client 602 contacts push platform 123 or pull platform 125 to obtain the updated usage amount.

At 330, resource meter client 602 stores the obtained usage amount in the mobile station 110 for later retrieval. For example, resource meter client 602 may create or utilize a local cache to store the obtained usage amount. Additionally, resource meter client 602 may store a timestamp in association with the usage amount, for later determining whether the stored usage amount is out of date. In some examples, the timestamp may be generated based on a clock running in mobile station 110. In some examples, the timestamp may be provided by network 120 along with the usage amount to indicate a time at which the usage amount was determined.

At 340, mobile station 110 or resource meter client 602 determines whether an alert should be presented to a user of mobile station 110. In some examples, the push notification may include a field or a payload portion that expressly indicates an alert is to be presented. In such examples, network 120 may be configured to determine that an event has occurred with respect to the mobile communication network resource allocation which should result in an alert to the user. For example, nearly all of the allocation may have been used. In some implementations, mobile station 110 may be configured to present such alerts without action by resource meter client 602. In some examples, resource meter client 602 may itself determine that an alert should be presented to the user.

At 350, in response to determining at 340 that an alert should be presented, the alert is presented to the user. The alert may be in the form of, for example, an audible indicator, a graphical alert, and/or a textual alert. In some implementations, an alert may be presented via a notification service provided by an operating system running on mobile station 110.

Figure 4:
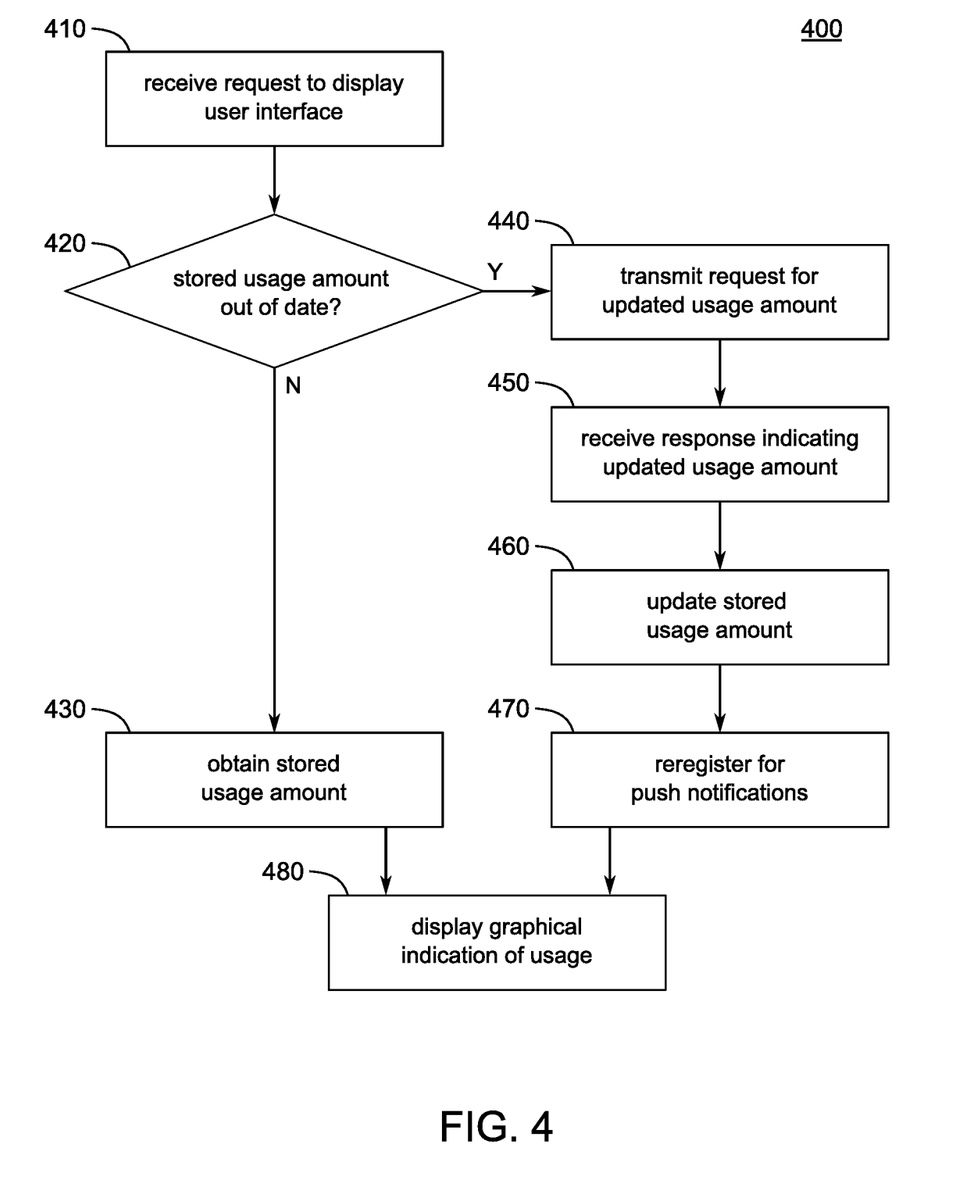
FIG. 4 illustrates an example of a method in which a resource meter client displays an indication of a usage amount, and may determine that a "pull" of usage information is required.

FIG. 4 illustrates an example of a method 400 in which a resource meter client 602 displays an indication of a usage amount, and may determine that a "pull" of usage information is required. At 410, resource meter client 602 receives a request to display a user interface, such as application UI 200. Resource meter client 602 may be configured to perform operations 420-470 in response to events other than receiving a request to display a user interface. For example, while resource meter client 602 is a background task, suspended, or not running, a timer may be triggered which causes resource meter client 602 to perform operations 420-470 to ensure resource meter client 602 has an up to date usage amount and that push notifications continue to be received.

At 420, resource meter client 602 determines whether a usage amount stored in mobile station 110, such as a usage amount stored at 330 in FIG. 3 or a usage amount stored at 460 in FIG. 4, is out of date. Typically, this is performed by comparing a current time with a timestamp stored in association with the usage amount stored in mobile station 110. In the event that a predetermined period of time has elapsed since the stored timestamp, method 400 proceeds to 440, otherwise method 400 proceeds to 430. In some examples, a timer may be initiated when an updated usage amount is received, with expiration of the timer indicating that a predetermined period of time has elapsed, resulting in method 400 proceeding to 440. In some implementations, expiration of the timer might trigger performing operations 440-470 independent of operations 410-430 and 480.

In some implementations, mobile station 110 may be configured to calculate an estimated incremental usage amount since storing the stored usage amount. For example, if the resource of interest is an amount of data transferred between mobile station 110 and network 120, mobile station may be configured to track amounts of data transferred to and from network 120 to provide an estimate of usage of the resource. Mobile station 110 may be configured to determine that the stored usage amount is out of date in response to the estimated incremental usage amount being equal to or greater than a predetermined amount.

At 430, the usage amount stored in mobile station 110 is obtained to be utilized at 480. At 440, it has been determined that the usage amount stored in mobile station 110 is out of date. Resource meter client 602 transmits a request for a usage amount of the mobile communication network resource allocation. This request may be transmitted to pull platform 125. Further details relating to handling of the request by pull platform 125 are discussed with respect to FIG. 6. At 450, resource meter client 602 receives a response to the request indicating an updated usage amount of the mobile communication network resource allocation. The updated usage amount is later used for operation 480. At 460, resource meter client 602 updates the stored usage amount that is accessed in operations 330 and 420, as discussed above. In some implementations, method 400 may include operation 470, in which, in response to the determination that the stored usage amount is out of date, resource meter client 602 reregisters, directly or indirectly, with push platform 125 to resume receiving push notifications indicating usage of the mobile network resource allocation.

At 480, resource meter client 602 causes to be displayed, on a display unit included in mobile station 110, a graphical indication of an amount of the mobile communication network resource allocation that has been used or remains to be used. This indication may be based on the usage amount obtained in operation 430 or received in operation 450, depending on the particular circumstances. FIG. 2 illustrates two nonlimiting examples of graphical indications: data transfer usage display 210 and voice communication usage display 220.

Figure 5:
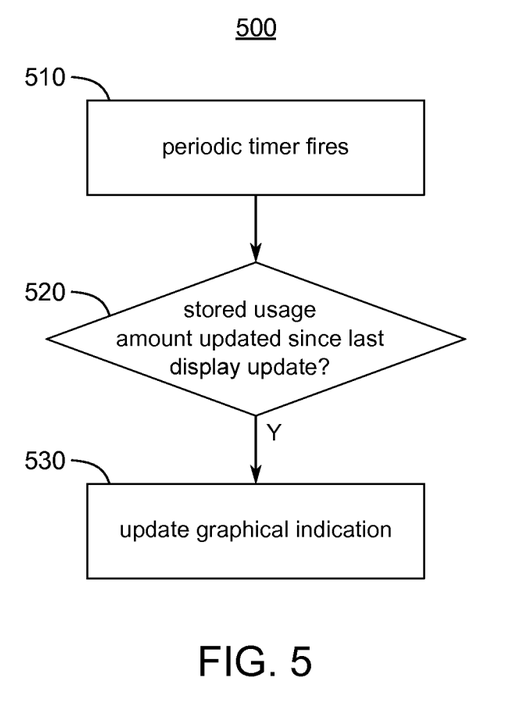
FIG. 5 illustrates an example of a method in which a resource meter client updates a graphical indication in response to a push notification being received while displaying the graphical indication.

FIG. 5 illustrates an example of a method in which a resource meter client updates a graphical indication in response to a push notification being received while displaying the graphical indication. At 510, while displaying a graphical indication of an amount of the mobile communication network resource allocation that has been used or remains to be used, a periodic timer fires. At 520, resource meter client 602 determines if the usage amount stored by the mobile station 110, such as the usage amount stored in operations 330 and 460, has been updated since the last time the graphical indication was updated. This might occur, for example, when a push notification is received and processed as illustrated in FIG. 3. At 530, in response to determining that the stored usage amount has been updated, resource meter client 602 causes to be displayed an updated graphical indication based on the updated stored usage amount.

FIG. 6 illustrates various examples in which elements illustrated in FIG. 1 may interact with each other. At 608, resource meter client 602 registers with push platform 123 for mobile station 110*b* to receive push notifications indicating usage of a mobile network resource allocation associated with mobile station 110*b*. Operation 608 may be performed, for example, during a first execution of resource meter client 602 by mobile station 110*b*. In an example in which push notifications are performed via the Apple Push Notification service (APNs), registration may include resource meter client 602 requesting a device token from push notification service 140 via an iOS operating system executed by mobile station 110, and resource meter client 602 providing the device token to push platform 123 for use in issuing future push notifications, such as at 618.

At 610, mobile station 110*b* makes use of a mobile network resource associated with the mobile network resource allocation by communicating with network 120 via base station 121. For example, if the resource of interest is an amount of data transferred, mobile station 110*b* might access data available via Internet 130 by using network 120. As part of providing the resource to mobile station 110*b*, base station 121 or other aspects of network 120 may report usage of the resource to network element 122 at 612. In response to the reported usage, network element 122 may determine which resource usage is applied against the mobile network resource allocation associated with mobile station 110*b*. At 614, network element 122 determines and provides a usage amount of the mobile network resource allocation to push platform 123. In some implementations, operation 614 may be performed periodically in response to usage reported to network element 122. In some implementations, operation 614 may be performed in response to particular predetermined events, such as, but not limited to a particular percentage (for example, every one percent) or fraction of the mobile network resource allocation having been used, or a particular amount of the mobile network resource allocation having been used (for example, every 100 megabytes of data transferred between mobile station 110*b* and network 120). In some implementations, user-specified events may be provided to network 120, such as via resource meter client 602. For example, a user may request updates be issued via push platform for every 50 megabytes of data transfers, rather than a default of 100 megabytes.

At 616, push platform 123 requests cache 124 stores the usage amount received at 614. As illustrated at 646, pull platform 125 may later obtain the stored usage amount from cache 124. By allowing the usage amount to be obtained via cache 124, computing load for other possible sources of the usage amount, such as network element 122 and push platform 123, is significantly reduced; particularly in a production environment with thousands or millions of users.

At 618, push platform 123 issues a push notification, via push notification service 140, indicating an update in the usage amount to resource meter client 602 executing on mobile station 110*b*. The push notification is a one-way, best-effort message delivery with no guaranteed or assured delivery to resource meter client 602. In some implementations, the push notification may include a payload which may include, for example, the updated usage amount (in the examples illustrated in FIG. 2, 2.544 GB or 113 minutes), the allocation amount (in the examples illustrated in FIG. 2, 10 GB or 600 minutes), a projected usage (in the examples illustrated in FIG. 2, 7.632 GB or 339 minutes), and/or a timestamp for the updated usage amount. In some implementations, a single push notification may include information for multiple mobile communication network resource allocations (for example, for the example illustrated in FIG. 2, a single push notification may have been provided indicating two usage amounts: 2.544 GB and 113 minutes). In some implementations, particular fields of the push notification or a payload portion of the push notification may cause mobile station 110b or resource meter client 602 to generate an alert, as discussed with respect to operations 340 and 350 in FIG. 3. In an example in which APNs is used as push notification service 140, a JSON-encoded payload of up to 256 bytes (prior to iOS 8) or up to 2048 bytes (iOS 8 and later) may be included in a push notification. Additionally, with APNs, a device token, as discussed above with respect to operation 608, and an application-specific cryptographic certification must be provided to push notification service 140 along with the payload.

At 620, push notification service 140 delivers the issued push notification to mobile station 110b. Delivery may be effected via network 120, although in certain situations, such as where mobile station 110b has access to Internet 130 via a wifi connection, the push notification may be delivered to mobile station 110b without network 120. At 622, resource meter client 602 obtains, via the push notification received by mobile station 110b, the updated usage amount. For example, an operating system executing on mobile platform 110b may utilize a callback method implemented by resource meter client 602 to provide access to information provided via a payload portion of the push notification. At 624, resource meter client 602 processes the updated usage amount, for example, as discussed above with respect to FIG. 3.

At a later time, operations 630-638 are performed much as discussed above with respect to operations 610-618. However, at 640, the push notification issued at operation 638 fails to be delivered to mobile station 110b. This failure may occur for any number of reasons. In some situations, mobile station 110b may receive the push notification, but mobile station 110b fails to notify resource meter client 602. In an implementation utilizing APNs, such situations may occur when a user of mobile station 110b has performed a "force quit" of resource meter client 602. Since push notification service 140 offers no guarantee or assurance of delivery of push notifications, and the push notification is a one-way communication, push platform 123 does not receive any indication that the push notification was not delivered.

At a later time, and before any subsequent push notification issued by push platform 123 and indicating a usage amount is delivered to mobile station 110b and/or provided to resource meter client 602, at 642 resource meter client 602 determines that a usage amount stored in mobile station 110b is out of date, as discussed above with respect to FIG. 4. In response to this determination, at 642 resource meter client 602 transmits a request to pull platform 125 for a usage amount of the mobile communication network resource allocation.

At 646, in response to the request transmitted at 644, pull platform 125 issues a request to cache 124 for the usage amount stored at, for example, operation 636. At 648, pull platform 125 obtains the stored usage amount from cache 124. Then, at 650, pull platform 125 transmits a response to resource meter client 602 responsive to the request transmitted at 644. At 652, resource meter client 602 processes the obtained usage amount, much as discussed above with respect to FIG. 4. As discussed above with respect to operation 470, at 654, resource meter client 602 may reregister for push notifications from push platform 123, under an assumption that the out of date situation detected at 642 was a result of updated usage amounts no longer being effectively delivered from push platform 123 via push notifications issued to resource meter client 602 on mobile station 110b.

The structure, programming and operations of the various types of mobile stations are well known. However, for completeness, it may be useful to consider the functional elements/aspects of two exemplary mobile stations 110a and 110b, at a high level.

Figure 7A:
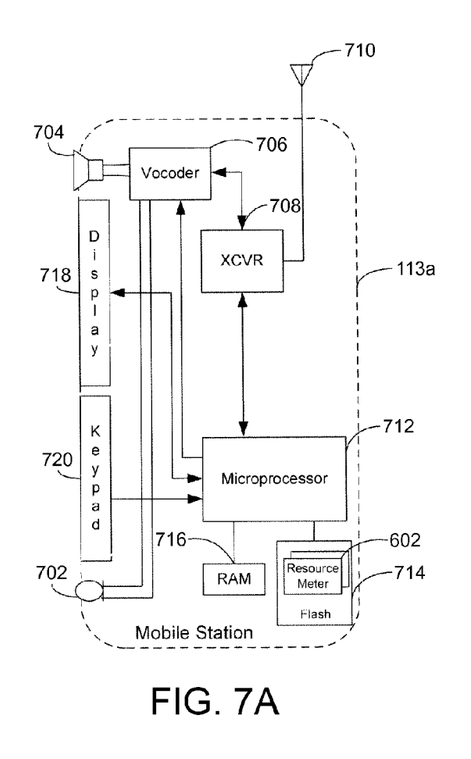
FIG. 7A is a high-level functional block diagram illustrating an example non-touch type mobile station that may utilize disclosed techniques through a network/system like that illustrated in FIG. 1.
Figure 7B:
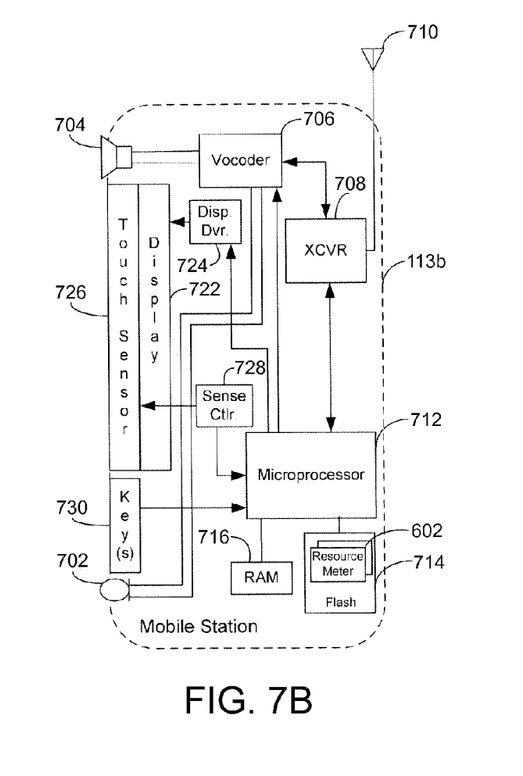
FIG. 7B is a high-level functional block diagram illustrating an example touch screen type mobile station that may utilize disclosed techniques through a network/system like that shown in FIG. 1.

For purposes of such a discussion, FIGS. 7A and 7B provide block diagram illustrations of an example non-touch type mobile station 110a, and an example touchscreen type mobile station 110b. For discussion purposes, the illustrations show the mobile stations 110a and 110b in the form of handsets. The handsets may be smart-phones or may be feature phones allowing at least some data communication capability.

The handset embodiment of the mobile station 110a functions as a normal digital wireless telephone station. For that function, the mobile station 110a includes a microphone 702 for audio signal input and a speaker 704 for audio signal output. The microphone 702 and speaker 704 connect to voice coding and decoding circuitry (vocoder) 706. For a voice telephone call, for example, the vocoder 706 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 110a also includes at least one digital transceiver (XCVR) 708. Today, the handset 110a would be configured for digital wireless communications using one or more of the common network technology types. The concepts discussed here encompass embodiments of the mobile station 110a utilizing any digital transceivers that conform to current or future developed digital wireless communication standards. The mobile station 110a may also be capable of analog operation via a legacy network technology.

The transceiver 708 provides two-way wireless communication of information, such as vocoded speech samples and/or digital information, in accordance with the technology of the network 120. The transceiver 708 also sends and receives a variety of signaling messages in support of the various voice and data services provided via the mobile station 110a and the communication network 120. Each transceiver 708 connects through RF send and receive amplifiers (not separately shown) to an antenna 710. The transceiver may also support various types of mobile messaging services (e.g., short message service (SMS)) and data services.

The mobile station 110a includes a display 718 for displaying messages, menus or the like, call related information dialed by the user, calling party numbers, etc., including data usage information for various data communications service over the mobile communication network. A keypad 720 enables dialing digits for voice and/or data calls as well as generating selection inputs, for example, as may be keyed-in by the user based on a displayed menu or as a cursor control and selection of a highlighted item on a displayed screen. The display 718 and keypad 720 are physical elements providing a textual or graphical user interface. Various combinations of the keypad 720, display 718, microphone 702, and speaker 704 may be used as physical input output elements of the graphical user interface (GUI), for multimedia (for example, audio and/or video) and data communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections related to resource usage metering.

A microprocessor 712 serves as a programmable controller for the mobile station 110a, in that it controls operation of the mobile station 110a in accord with programming that it executes, for all normal operations, and for operations involved in obtaining accurate information relating to usage of data communication service over the mobile communication by the mobile station under consideration here. In the example, the mobile station 110a includes flash type program memory 714, for storage of various "software" or "firmware" program routines and mobile configuration settings, such as mobile directory number (MDN) and/or mobile identification number (MIN), etc. The mobile station 110a may also include a random access memory (RAM) 716 for a working data processing memory. Of course, other storage devices or configurations may be added to or substituted for those in the example. In a present implementation, the flash type program memory 714 stores firmware such as a boot routine, device driver software, an operating system, call processing software and vocoder control software, and any of a wide variety of other applications, such as client browser software, short message service software, and resource meter client 602.

As noted earlier, the resource meter client 602 configures the mobile station 110a to perform various functions including real-time resource usage metering functions disclosed herein. By way of example, the resource meter client 602, via the real-time resource metering functions, receives push notifications issued by push platform 123 to obtain information indicating usage of a mobile communication network resource allocation associated with mobile station 110a through the mobile communication network 120. The resource meter client 602, via the real-time resource usage metering functions, presents an indication of usage of a mobile communication network resource allocation associated with mobile station 110a to a user of the mobile station 110a.

Further, via the real-time resource usage metering functions, the resource meter client 602 detects occurrence of a condition indicating possible inability to receive push notifications from push platform 123 by the mobile station 110a. Responsive to the detected occurrence of the condition, the resource meter client 602 communicates through the mobile communication network 120 from the mobile station 110a to obtain information indicating a current estimate amount of usage of a mobile communication network resource allocation associated with mobile station 110a, from pull platform 125 on the mobile communication network 120. The resource meter client 602, via the real-time resource usage metering functions, presents an indication of usage of a mobile communication network resource allocation associated with mobile station 110a to a user of the mobile station 110a.

The memories 714, 716 also store various data, such as telephone numbers and server addresses, downloaded data such as multimedia content, and various data input by the user. Programming stored in the flash type program memory 714, sometimes referred to as "firmware," is provided to and executed by the microprocessor 712.

As outlined above, the mobile station 110a includes a processor 712, and programming stored in the flash memory 714 which configures the processor 712 so that the mobile station 110a is capable of performing various desired functions, including in this case the functions involved in the technique for obtaining and updating real-time resource usage of a mobile communication network resource allocation associated with mobile station 110a.

FIG. 7B provides a block diagram illustration of an example touch screen type mobile station 110b. Some examples of touch screen type mobile station 110b include the Apple iPhone series of smartphone devices, which utilize the iOS operating system. Although possibly configured somewhat differently, at least logically, a number of the elements of the example touch screen type mobile station 110b are similar to the elements of mobile station 110a, and are identified by like reference numbers in FIG. 7A. For example, the touch screen type mobile station 110b includes a microphone 702, speaker 704, and vocoder 706 for audio input and output functions, much as discussed above with respect to mobile station 110a. The mobile station 110b also includes at least one digital transceiver (XCVR) 708, for digital wireless communications, although the handset 110b may include an additional digital or analog transceiver.

As in the mobile station 110a, the transceiver 708 provides two-way wireless communication of information, such as vocoded speech samples and/or digital information, in accordance with the technology of the network 120. The transceiver 708 also sends and receives a variety of signaling messages in support of the various voice and data services provided via the mobile station 110b and the mobile communication network 120. Each transceiver 708 connects through RF send and receive amplifiers (not separately shown) to an antenna 710. The transceiver 708 may also support various types of mobile messaging services.

As in the example of mobile station 110a, a microprocessor 712 serves as a programmable controller for the mobile station 110b, in that it controls operations of the mobile station 110b in accord with programming that it executes, for all normal operations, and for operations involved in the procedure of obtaining and updating real-time resource usage by the mobile station 110b under consideration herein. In the example, the mobile station 110b includes flash type program memory 714, for storage of various program routines and mobile configuration settings. The mobile station 110b may also include a random access memory (RAM) 716 for a working data processing memory. Of course, other storage devices or configurations may be added to or substituted for those in the example. Hence, outlined above, the mobile station 110b includes a processor, and programming including the resource meter client 602. The programming stored in the flash memory 714 configures the processor of the mobile station to perform various desired functions, including in this case the functions involved in obtaining and updating the real-time resource usage by the mobile station 110b from a push platform 123 and a pull platform 125.

The resource meter client 602 is an application program running in the mobile station 110b and performs various functions in support of real-time resource usage metering on the mobile station 110b. As noted earlier, the resource meter client 602 performs real-time resource usage metering functions. The mobile station 110b communicates, via the real-time resource usage metering functions, receives push notifications issued by push platform 123 to obtain information indicating usage of a mobile communication network resource allocation associated with mobile station 110a through the mobile communication network 120. The resource meter client 602, via the real-time resource usage metering functions, presents an indication of usage of a mobile communication network resource allocation associated with mobile station 110a to a user of the mobile station 110a.

Further, the resource meter client 602, via the real-time resource usage metering functions, detects occurrence of a condition indicating possible inability to receive push notifications from push platform 123 by the mobile station 110a. Responsive to the detected occurrence of the condition, the resource meter client 602 communicates through the mobile communication network 120 from the mobile station 110a to obtain information indicating a current estimate amount of usage of a mobile communication network resource allocation associated with mobile station 110a, from pull platform 125 on the mobile communication network 120. The resource meter client 602, via the real-time resource usage metering functions, presents an indication of usage of a mobile communication network resource allocation associated with mobile station 110a to a user of the mobile station 110a.

In the example of FIG. 7A, the user interface elements include a display 718 and a keypad 720. The mobile station 110b may have a limited number of keys 730, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the example mobile station 110b includes a display 722, which the microprocessor 712 controls via a display driver 724, to present visible outputs to the user of the mobile station 110a. The mobile station 110b also includes a touch/position sensor 726. The sensor 726 is relatively transparent, so that the user may view and interact with the information presented on the display 722. A sense circuit 728 senses signals from elements of the touch/position sensor 726 and detects occurrence and position of each touch of the screen formed by the display 722 and sensor 726. The sense circuit 728 provides touch position information to the microprocessor 712, which can correlate that information to the information currently displayed via the display 722, to determine the nature of user input via the screen.

The display 722 and touch sensor 726 (and possibly one or more keys 730, if included) are physical elements providing an interactive textual and graphical user interface for the mobile station 110b. The microphone 702 and speaker 704 may be used as additional user interface elements, for audio input and output.

The structure and operation of the mobile stations 110a and 110b, as outlined above, were described to by way of example, only.

As shown by the earlier discussion, functions relating to providing information relating to usage of a mobile communication network resource allocations associated with mobile stations may be implemented on computers connected for data communication via the components of a packet data network, operating as, for example, push platform 123 and pull platform 125 as shown in FIG. 1 in communication with each other and/or with the mobile stations 110. Although special purpose devices may be used, such devices also may be implemented using one or more hardware platforms intended to represent a general class of data processing device commonly used to run "server" programming so as to implement the billable resource usage related functions discussed above, albeit with an appropriate network connection for data communication.

The software functionalities involve programming, including executable code as well as associated stored data, e.g. files used for the application UI 200 and resource meter client 602. The software code is executable by the general-purpose computer that functions as the push platform 123 and pull platform 125 and/or the processor of a mobile station 110. In operation, the code is stored within the general-purpose computer platform or mobile station 110. At other times, however, the software may be stored at other locations and/or transported for loading into the appropriate general-purpose computer system or mobile station 110. Execution of such code by a processor of the computer platform and/or mobile station 110 enables the platform or mobile station 110 to implement the methodology for obtaining and updating current estimate amount of usage of data communication service by the mobile station, in essentially the manner performed in the implementations discussed and illustrated herein.

Figure 8:
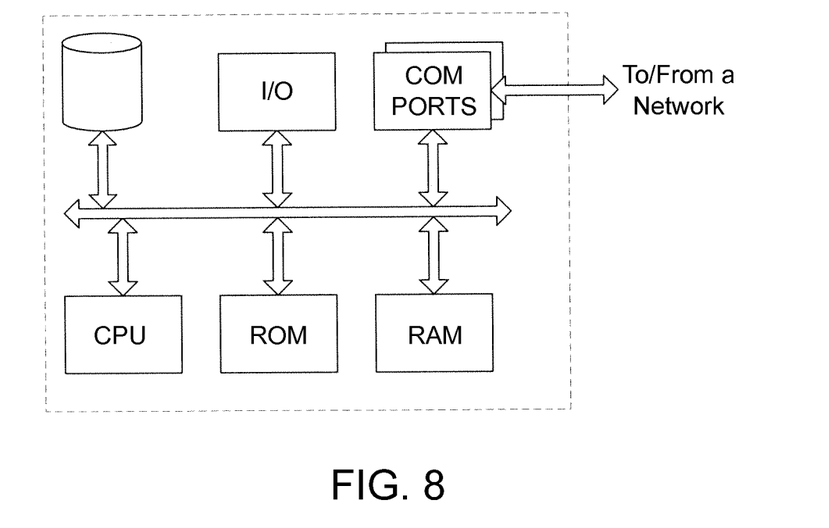
FIG. 8 illustrates a simplified functional block diagram of a computer that may be configured as a host or server, for example, to function as a network element, pull system, or push system in the system illustrated in FIG. 1.
Figure 9:
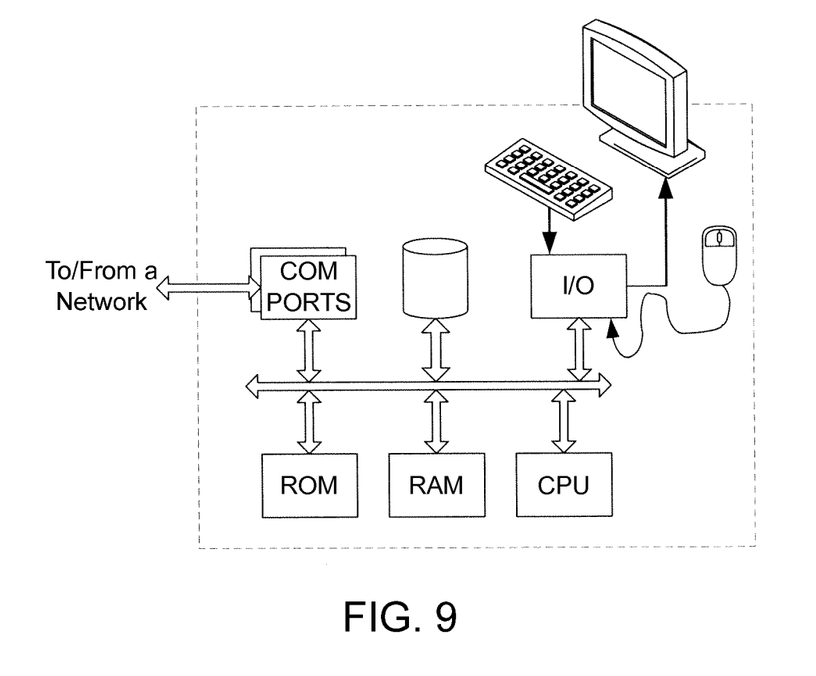
FIG. 9 illustrates a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that the structure, programming and general operation of such computer equipment are well known and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and are well known. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile station type user terminal may include similar elements (compare to FIGS. 7A and 7B), but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. It is presumed that the hardware elements, operating systems and programming languages of such user terminal devices also are conventional in nature and are well known.

Hence, aspects of the methods of obtaining and updating usage information of data communication service over the mobile communication network by a mobile station outlined above may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the carrier into the computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as computer or machine "readable medium" refer to any medium that participates in providing instructions to a processor for execution.

Hence, a machine readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the techniques for providing and updating real-time data usage of data communication service by the mobile station, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   obtaining, via a first push notification received by a mobile station, a first usage amount of a mobile communication network resource allocation associated with the mobile station;
   storing, in the mobile station, the first usage amount;
   determining, at the mobile station, that the stored first usage amount is out of date;
   in response to the determination that the stored first usage amount is out of date, transmitting a request for a usage amount of the mobile communication network resource allocation;
   receiving a response to the request, the response indicating a second usage amount of the mobile communication network resource allocation;
   displaying, on a display unit included in the mobile station, a graphical indication of an amount of the mobile communication network resource allocation that has been used or remains to be used, based on the second usage amount;
   obtaining, via a second push notification received by the mobile station, a third usage amount of the mobile communication network resource allocation;
   storing, in the mobile station, the third usage amount;
   determining, at the mobile station, that the stored third usage amount is not out of date; and
   displaying, on the display unit, a graphical indication of an amount of the mobile communication network resource allocation that has been used or remains to be used, based on the third usage amount.

2. The method of claim 1, further comprising:
   identifying a first time associated with the first usage amount;
   wherein the determination that the stored first usage amount is out of date is based on a predetermined amount of time having elapsed since the first time.

3. The method of claim 1, further comprising:
   estimating, at the mobile station, an estimated usage of the mobile network resource subsequent to obtaining the first usage amount,
   wherein the determination that the stored first usage amount is out of date is based on the estimated usage being equal to or greater than a predetermined amount.

4. The method of claim 1, wherein the first usage amount relates to an amount of data transferred between the mobile station and a mobile communication network.

5. The method of claim 1, wherein the first usage amount relates to an amount of time the mobile station has performed voice communication via a mobile communication network.

6. The method of claim 1, further comprising:
   transmitting, in response to the determination that the stored first usage amount is out of date, a request to register the mobile station to receive push notifications indicating usage of the mobile network resource allocation.

7. The method of claim 1, further comprising:
   displaying an alert on the display unit in response to the first push notification.

8. The method of claim 1, wherein
   the graphical indication is displayed via a widget application, and
   the determination that the stored first usage amount is out of date is performed in response to a request to display the widget application.

9. A non-transitory computer readable medium including instructions which, when executed by one or more processors included in the mobile station, cause the mobile station to perform the method of claim 1.

10. A method comprising:
    obtaining a first usage amount of a mobile communication network resource attributed to a mobile communication network resource allocation associated with a mobile station;
    determining, based on the first usage amount, a second usage amount of the mobile communication network resource allocation;
    issuing, for receipt by the mobile station, a push notification indicating the second usage amount;
    obtaining a third usage amount of the mobile communication network resource attributed to the mobile communication network resource allocation;
    determining, based on the third usage amount, a fourth usage amount of the mobile communication network resource allocation;
    storing the fourth usage amount;
    receiving a first request, from the mobile station, for a usage amount of the mobile communication network resource allocation;
    transmitting, in response to the received first request and to the mobile station, a response indicating the fourth usage amount.

11. The method of claim 10, wherein
    the third usage amount is obtained from a first computer system;
    the fourth usage amount is stored by a second computer system, which is different from the first computer system.

12. The method of claim 11, wherein
    the request is received by a third computer system, which is different from the first and second computer systems; and
    the response is transmitted by the third computer system.

13. The method of claim 10, wherein the push notification is issued in response to the second usage amount being greater than or equal to a threshold amount.

14. The method of claim 10, further comprising:
    receiving a second request to register the mobile station to receive push notifications indicating usage of the mobile network resource allocation;
    registering, in response to the second request, the mobile station to receive push notifications indicating usage of the mobile network resource allocation; and
    determining, in response to obtaining the first usage amount, that the mobile station is registered to receive push notifications indicating usage of the mobile network resource allocation, wherein
    the push notification is issued in response to the determination that the mobile station is registered to receive push notifications indicating usage of the mobile network resource allocation, and
    the fourth usage amount is stored in response to the determination that the mobile station is registered to receive push notifications indicating usage of the mobile network resource allocation.

15. The method of claim 10, wherein the mobile communication network resource includes data transferred between the mobile station and a mobile communication network providing the mobile communication network resource.

16. One or more non-transitory computer readable mediums including instructions which, when executed by one or more processors, cause the processors to perform the method of claim 10.

17. A system comprising:
a network element configured to:
determine a first usage amount of a mobile communication network resource by one or more mobile stations associated with a mobile communication network resource allocation,
determine a second usage amount of the mobile communication network resource by the one or more mobile stations, and
provide the second usage amount to a push platform;
the push platform, configured to:
obtain the first usage amount,
determine, based on the first usage amount, a third usage amount of the mobile communication network resource allocation,
issue, for receipt by a first mobile station included in the one or more mobile stations, a push notification indicating the third usage amount,
obtain the second usage amount,
determine, based on the second usage amount, a fourth usage amount of the mobile communication network resource allocation, and
provide the fourth usage amount to a cache system for storage by the cache system; and
a pull platform, configured to:
receive a request, from the first mobile station, for a usage amount of the mobile communication network resource allocation,
obtain, in response to the request, the fourth usage amount from the cache system, and
transmit, in response to the received request and to the mobile station, a response indicating the fourth amount.

18. The system of claim 17, wherein the mobile communication network resource includes data transferred between the one or more mobile stations and a mobile communication network providing the mobile communication network resource.

* * * * *